United States Patent [19]

Kimura et al.

[11] Patent Number: 5,349,492
[45] Date of Patent: Sep. 20, 1994

[54] CAPACITIVE PRESSURE SENSOR

[75] Inventors: Shigeo Kimura; Yoshiyuki Ishikura; Takashi Masuda; Takaaki Kuroiwa; Takashi Kihara, all of Kanagawa, Japan

[73] Assignee: Yamatake-Honeywell Co., Ltd., Tokyo, Japan

[21] Appl. No.: 994,713

[22] Filed: Dec. 22, 1992

[30] Foreign Application Priority Data

Dec. 26, 1991 [JP] Japan .................. 3-356678

[51] Int. Cl.$^5$ ............................. H01G 7/00
[52] U.S. Cl. ................... 361/283.4; 73/724
[58] Field of Search ............ 361/283, 283.1, 283.4; 73/718, 724; 29/25.41

[56] References Cited

U.S. PATENT DOCUMENTS

| | | | |
|---|---|---|---|
| 4,064,549 | 12/1977 | Cretzler ........................ | 361/283 |
| 4,084,438 | 4/1978 | Lee et al. ...................... | 361/283 |
| 4,410,872 | 10/1983 | Stecher et al. ................ | 361/283 |
| 4,572,000 | 2/1986 | Kooiman ...................... | 73/718 |
| 4,972,717 | 11/1990 | Southworth et al. ........ | 73/724 |
| 5,201,228 | 4/1993 | Kojima et al. ............... | 73/724 |

FOREIGN PATENT DOCUMENTS 2-148768 7/1990 Japan .

OTHER PUBLICATIONS

C. Y. Lee et al. "Quartz Capsule Pressure Transducer for the Automotive Industry" published by Society of Automotive Engineers Inc., Feb. 23-27, 1981.

Primary Examiner—Bruce A. Reynolds
Assistant Examiner—Gregory Mills
Attorney, Agent, or Firm—Blakely, Sokoloff, Taylor & Zafman

[57] ABSTRACT

A capacitive pressure sensor includes first and second substrates, a groove, and first and second electrodes. The first substrate consists of an electrical insulating material. The second substrate consists of the same material as that for the first substrate and has a peripheral portion directly bonded to the first substrate. The groove is formed in a central portion of the surface of one of the first and second substrates. The first and second substrates oppose each other through the groove. The first electrode is coupled to a surface, of the first substrate, which opposes the second substrate so as to be movable together with the first substrate. The second electrode is arranged on a surface, of the second substrate, which opposes the first substrate so as to be parallel to the first electrode. The first and second substrate may consist of quartz glass or sapphire. The first and second substrates are bonded to each other at a temperature lower than the melting point of the substrate material without forming any bonding layer.

2 Claims, 10 Drawing Sheets

CAPACITIVE PRESSURE SENSOR

BACKGROUND OF THE INVENTION

The present invention relates to a capacitive sensor having a diaphragm structure and designed to capacitively detect a change in pressure to be measured.

Generally, in a capacitive sensor, in order to minimize the parasitic capacitance formed between a pair of electrodes constituting a sensing capacitor portion, an insulating material must be used for at least one of the substrates.

As a pressure sensor of this type, a capacitive pressure sensor has been proposed (C. Y. Lee et al., "Quartz Capsule Pressure Transducer for the Automotive Industry", Society of Automotive Engineers, Inc., 1980). As shown in FIG. 1A, in this sensor, a quartz glass or sapphire substrate 2 having a stationary electrode 1, and a quartz glass or sapphire substrate 4 having a movable electrode 3 are arranged such that the surfaces of their electrodes oppose each other, and peripheral portions of the substrates 2 and 4 are bonded to each other with a low-melting glass 5 so as to have a predetermined gap G therebetween. As shown in FIG. 1B, a sensing capacitor portion 3s is formed at a central portion of the movable electrode 3, and a reference capacitor portion 3r is formed at a peripheral portion thereof.

As another pressure sensor of the same type, a capacitive pressure sensor having a diaphragm structure has been proposed (Japanese Patent Laid-Open No. 2-148768). As shown in FIG. 2, in this sensor, a cover glass 7 consisting of pyrex and having a stationary electrode 6, and a silicon wafer 9 having recess portions formed in its upper and lower surfaces and having a movable electrode 8 in the recess portion in the upper surface are arranged such that the surfaces of their electrodes oppose each other, and peripheral portions of the cover glass 7 and the silicon wafer 9 are bonded to each other through a bonding portion 10 by anodic bond.

However, according to the pressure sensor shown in FIGS. 1A and 1B, since the low-melting glass 5 is used to couple the quartz glass or sapphire substrate 2 to the quartz glass or sapphire substrate 4, which are arranged to oppose each other, the controllability of the gap G on the order of several μm or less is poor. Therefore, in order to obtain a predetermined capacitance value, the size of each electrode must be increased, and the size of the pressure sensor is inevitably increased. In this case, for example, the size of the pressure sensor is as large as 25.4 mmφ. In addition, the controllability of the base capacitance is poor, resulting in considerable disadvantages in terms of productivity and cost.

Since the low-melting glass 5 different from the substrate material is used as the bonding material between the quartz glass or sapphire substrate 2 and the quartz glass or sapphire substrate 4, a stress is generated by the difference between the coefficients of thermal expansion of the substrate material and the low-melting material with a variation in measurement temperature. As the temperature dependence of the sensor sensitivity is increased, drift tends to occur.

A bonding operation using the low-melting glass 5 is performed at a temperature of about 300° C. or more. When the resultant structure is cooled down to a working temperature after the bonding operation, a residual stress is generated. This stress gradually changes with time and hence adversely affects high-precision, reliable pressure measurement.

According to the pressure sensor shown in FIG. 2, the cover glass 7 and the silicon wafer 9 are made of different materials, i.e., pyrex and silicon. Although the coefficients of thermal expansion of pyrex and silicon are close to each other, they are not completely the same. For this reason, when the structure formed by bonding the cover glass 7 to silicon wafer 9 at a temperature of several hundreds degrees is cooled down to a working temperature, the stress remains in the bonding portion 10 between the cover glass 7 and the silicon wafer 9. Although this stress is small, since the stress changes with time, high-precision, reliable pressure measurement is adversely affected by the stress.

SUMMARY OF THE INVENTION

It is, therefore, an object of the present invention to provide a capacitive pressure sensor which uses an insulating substrate to eliminate a parasitic capacitance, and which is excellent in precision and productivity, and can perform highly reliable pressure measurement without being influenced by a residual stress due to an inter-substrate bonding operation.

In order to achieve the above object, according to the present invention, there is provided a capacitive pressure sensor comprising a first substrate essentially consisting of an electrical insulating material, a second substrate essentially consisting of the same material as that for the first substrate and having a peripheral portion directly bonded to the first substrate, a groove formed in a central portion of a surface of one of the first and second substrates, the first and second substrates opposing each other through the groove, a first electrode coupled to a surface, of the first substrate, which opposes the second substrate so as to be movable together with the first substrate, and a second electrode arranged on a surface, of the second substrate, which opposes the first substrate so as to be parallel to the first electrode.

BRIEF DESCRIPTION OF THE DRAWINGS

FIGS. 8A and 8B are views for explaining the bonded state between quartz glass substrates, in which FIG. 8A is an enlarged sectional view of a bonding portion, and FIG. 8B is a view for explaining a molecular bond.

DESCRIPTION OF THE PREFERRED EMBODIMENTS

Embodiments of the present invention will be described in detail below with reference to the accompanying drawings.

Figure 1A:
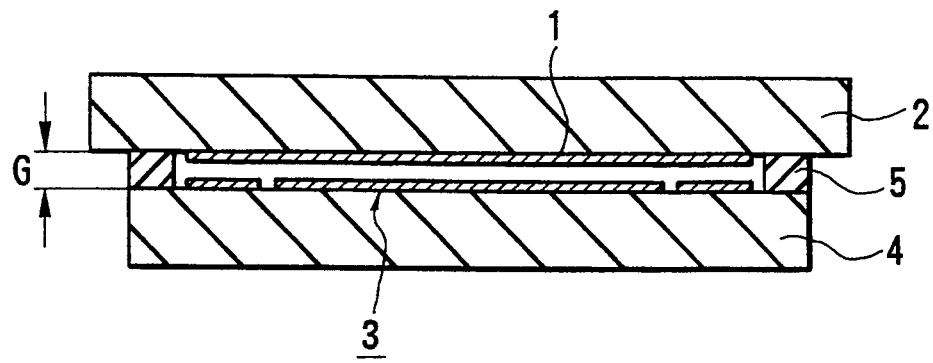
FIGS. 1A and 1B are sectional and plan views, respectively, for explaining an arrangement of a conventional capacitive pressure sensor.
Figure 1B:
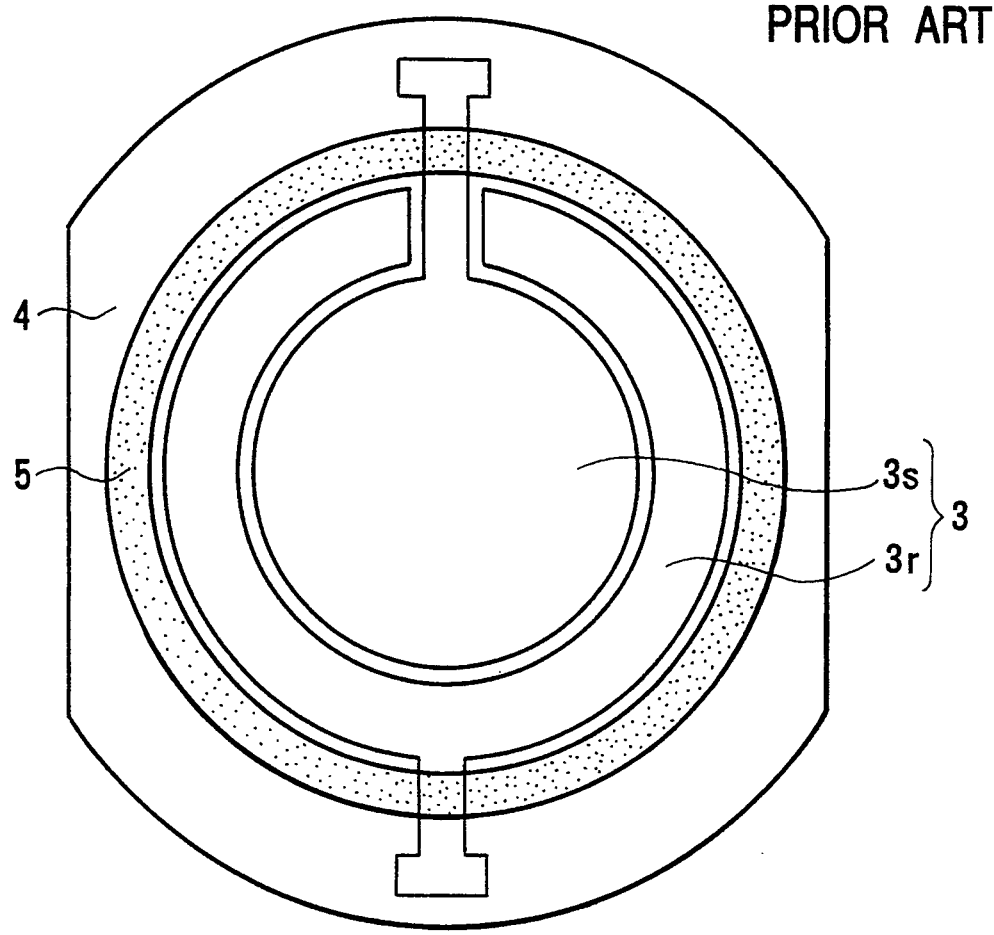
Figure 2:
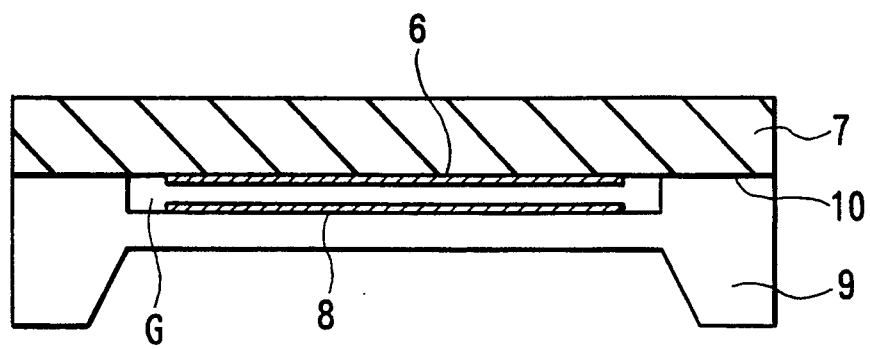
FIG. 2 is a sectional view for explaining an arrangement of another conventional capacitive pressure sensor.
Figure 3A:
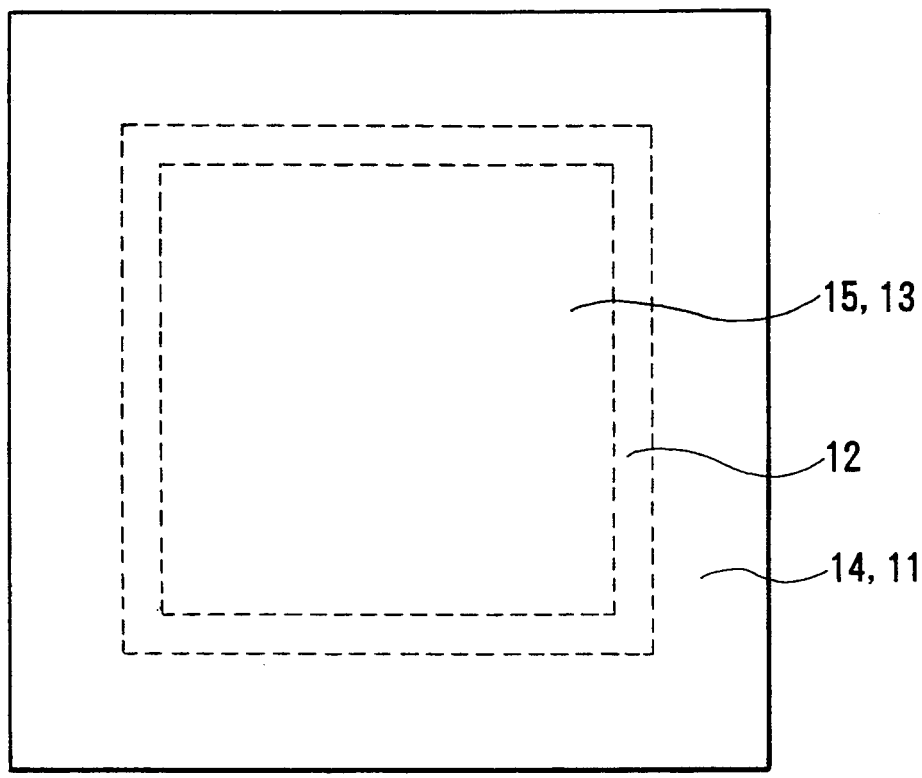
FIGS. 3A and 3B are plan and sectional views, respectively, showing the arrangement of a capacitive pressure sensor according to an embodiment of the present invention.
Figure 3B:
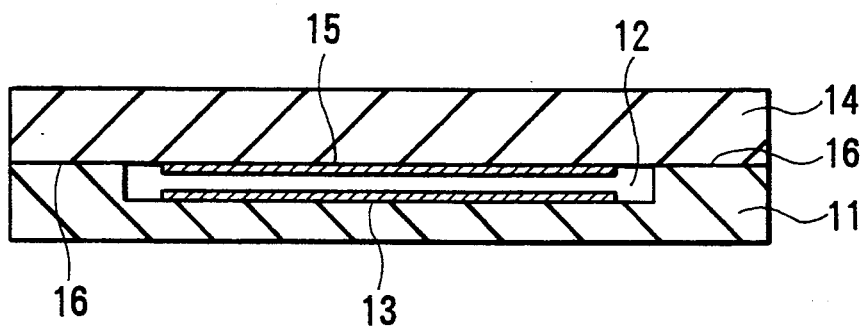

FIGS. 3A and 3B show the arrangement of a capacitive pressure sensor according to an embodiment of the present invention. Referring to FIGS. 3A and 3B, a shallow groove 12 which is square as a whole and has a U-shaped cross-section is formed in a central portion of the upper surface of a quartz glass or sapphire substrate 11 constituting a first substrate portion. A movable electrode 13 as a first electrode consisting of a conductive film is formed on the bottom portion of the groove 12.

A stationary electrode 15 as a second electrode consisting of a conductive film which is almost square as a whole is formed on a central portion of the upper surface of a quartz glass or sapphire substrate 14 constituting a second substrate portion. The quartz glass or sapphire substrate 11 on which the movable electrode 13 is formed, and the quartz glass or sapphire substrate 14 on which the stationary electrode 15 is formed are arranged such that their electrode-formed surfaces oppose each other, and their peripheral portions as bonding portions 16 are tightly fixed to each other by direct bonding without using a bonding material.

In this case, both surfaces as the bonding portions 16 of the quartz glass or sapphire substrate 11 and the quartz glass or sapphire substrate 14 are formed into flat mirror surfaces, a surface roughness Ra of each of which is about 100 Å or less. The quartz glass or sapphire substrate 11 and the quartz glass or sapphire substrate 14 are arranged to oppose each other and are bonded to each other at room temperature, and the resultant structure is heated up to 200° to a temperature less than the melting temperature of each substrate. As a result, both the quartz glass or sapphire substrates are tightly and firmly bonded to each other by physical and chemical bonding forces.

In this arrangement, the quartz glass or sapphire substrate 11 on which the movable electrode 13 is formed is displaced in accordance with a pressure. Therefore, pressure measurement is performed by measuring the capacitance between the movable electrode 13, formed on the quartz glass or sapphire substrate 11 which is displaced with a change in pressure, and the stationary electrode 15 on the quartz glass or sapphire substrate 14.

According to such an arrangement, since the quartz glass or sapphire substrate 11 and the quartz glass or sapphire substrate 14 are made of the same material, and are tightly bonded to each other by physical and chemical forces without using any bonding material, no residual stress is generated even if the quartz glass or sapphire substrate 11 and the quartz glass or sapphire substrate 14 are bonded to each other at a temperature higher than a working temperature and is subsequently cooled down to the working temperature. In addition, even if the working temperature changes, since the quartz glass or sapphire substrate 11 and the quartz glass or sapphire substrate 14 consist the same material, the temperature characteristics of the pressure sensor are not adversely affected by the bonding operation. Therefore, a high-precision pressure sensor can be manufactured.

Note that in addition to the above-described effects, if quartz glass or sapphire substrates are used as the first and second substrate portions, positioning in the process of bonding the substrates can be easily performed by viewing from above one of the substrates by the naked eye or through an optical microscope, thus greatly improving the productivity.

As the quartz glass or sapphire substrate 11 and the quartz glass or sapphire substrate 14, wafers which have almost no surface roughness and can be bonded to each other without using any bonding material are relatively easy to obtain. Therefore, a high-precision pressure sensor can be easily manufactured at low cost.

The depth of the groove 12 can be controlled on the order of submicrons. In addition, this depth does not vary before and after a bonding operation because bonding of the first and second substrates is performed without using any bonding material and melting the substrates. Therefore, the distance between the electrodes can be controlled on the order of submicrons, allowing a reduction in the size of a sensor element. The reduction in size also enables a reduction in the cost of the sensor element.

Moreover, quartz glass or sapphire substrates can be easily worked in a general semiconductor manufacturing process. In the arrangement shown in FIGS. 3A and 3B, the electrode 15 is formed as a stationary electrode. Even if, however, both the electrodes 13 and 15 are formed as movable electrodes, the same effects as described above can be obtained.

Figure 4A:
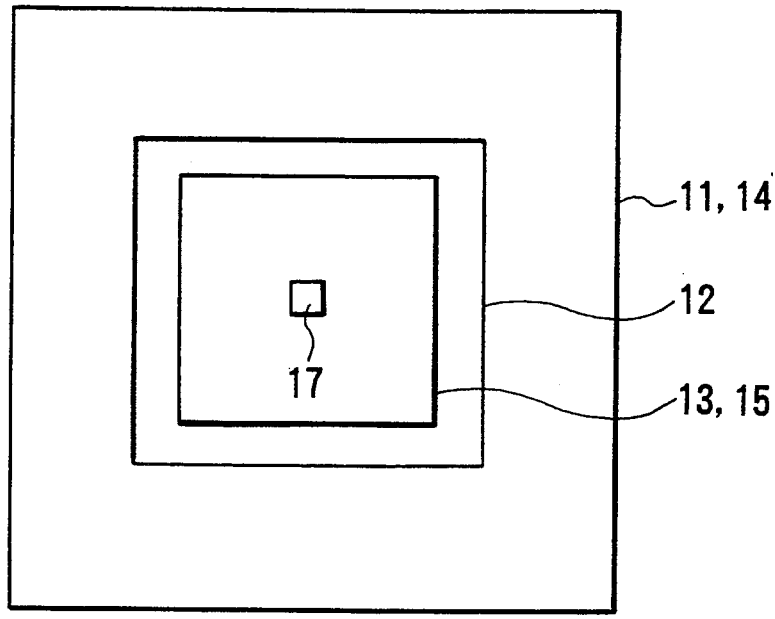
FIGS. 4A and 4B are plan and sectional views, respectively, showing the arrangement of a capacitive pressure sensor according to another embodiment of the present invention.
Figure 4B:
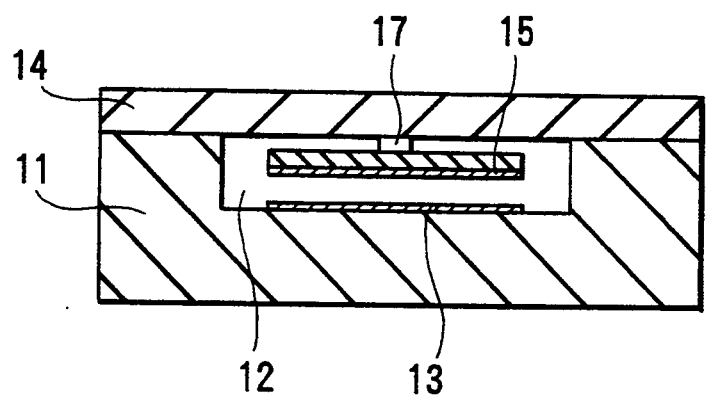

FIGS. 4A and 4B show the arrangement of a capacitive pressure sensor according to another embodiment of the present invention. The same reference numerals in FIGS. 4A and 4B denote the same parts as in FIGS. 3A and 3B. The sensor shown in FIGS. 4A and 4B is different from the one shown in FIGS. 3A and 3B in that a second electrode 15 is not in tight contact with a second substrate 14 but is arranged on a joist 17 formed on the second substrate 14.

With this arrangement, the same effects as described above can be obtained. In addition, since the second substrate 15 is arranged on the joist 17, the following new effect can be obtained. When a measurement pressure is applied to the second substrate 14 from a direction opposite to the first substrate 11, i.e., from the surface of the second substrate 14 on the opposite side of a groove 12, and an atmospheric pressure or a vacuum is set in the groove 12, the second electrode 15 serves as a movable electrode. As a result, the sensor serves as an absolute pressure sensor or an atmospheric reference pressure sensor, and a change in capacitance value is increased with a change in sensor pressure, thereby obtaining a high sensitivity.

Figure 5A:
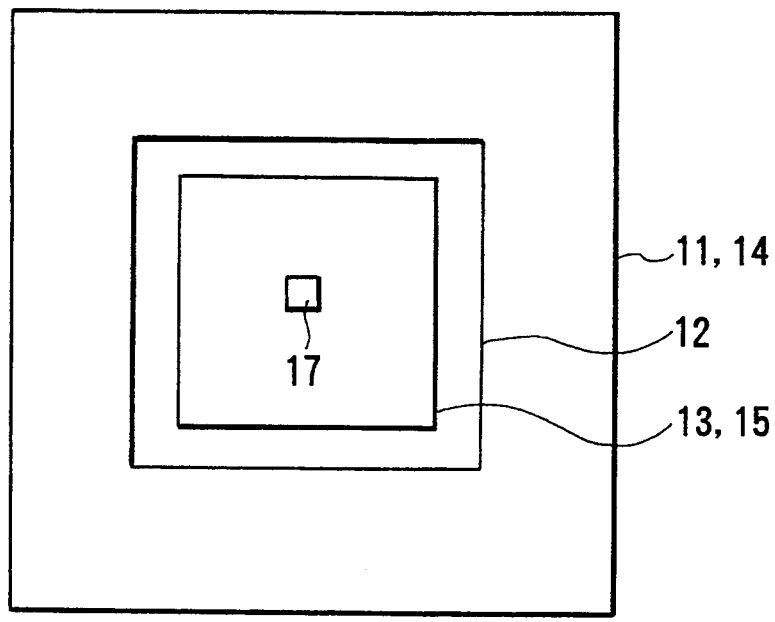
FIGS. 5A and 5B are plan and sectional views, respectively, showing the arrangement of a capacitive pressure sensor according to still another embodiment of the present invention.
Figure 5B:
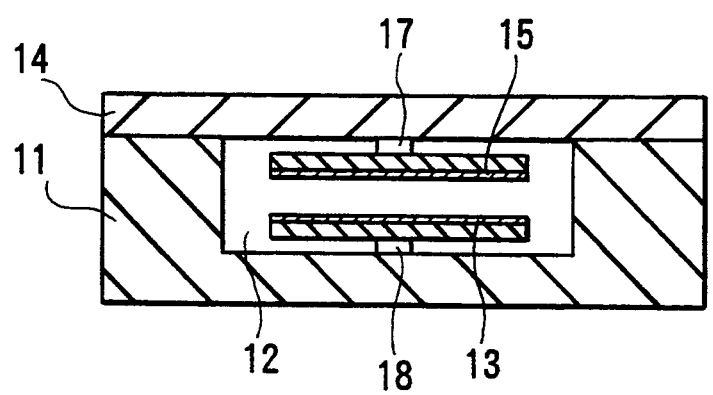

FIG. 5A and 5B show the arrangement of a capacitive pressure sensor according to still another embodiment of the present invention. The same reference numerals in FIGS. 5A and 5B denote the same parts as in FIGS. 4A and 4B. The sensor shown in FIGS. 5A and 5B is different from the one shown in FIGS. 4A and 4B in that both first and second electrodes 13 and 15 are arranged on joists 17 and 18 but are not in tight contact with the substrates, respectively.

With this arrangement, the same effects as those in the embodiment shown in FIGS. 3A and 3B can be obtained. In addition, the following new effect can be obtained. When a measurement pressure as a pressure difference is applied from two directions, i.e., from the surface of a second substrate 14 on the opposite side of a groove 12 and from the surface of a first substrate 11 on the opposite side of the groove 12, the first and second electrodes 13 and 15 serve as movable electrodes. As a result, the sensitivity of the sensor as a pressure difference measurement sensor is greatly improved.

Figure 6A:
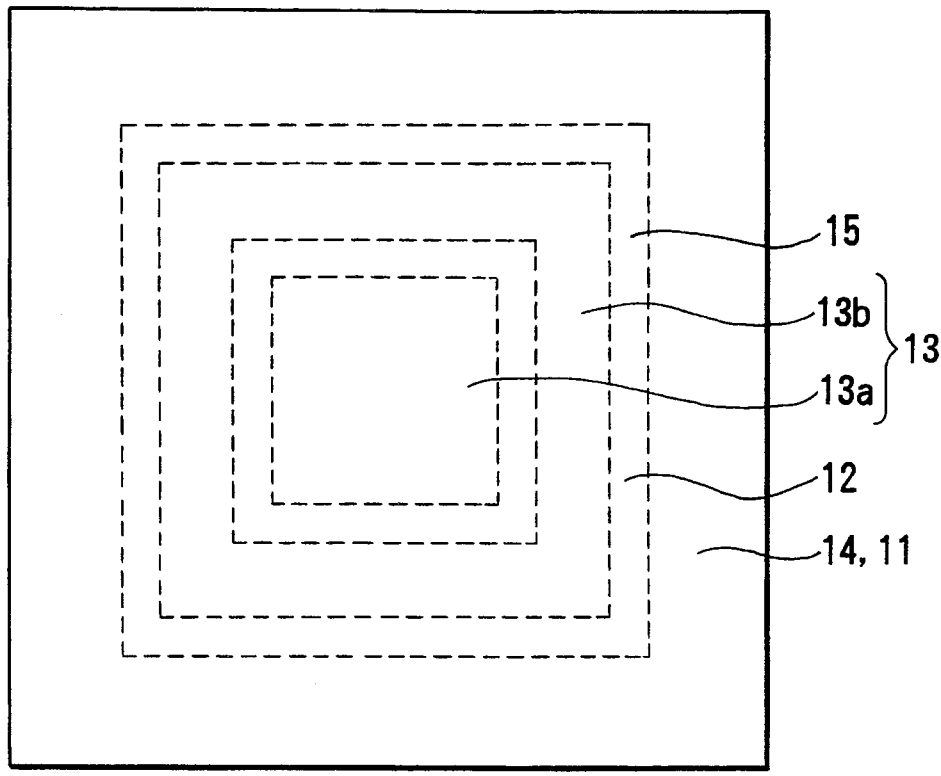
Figure 6B:
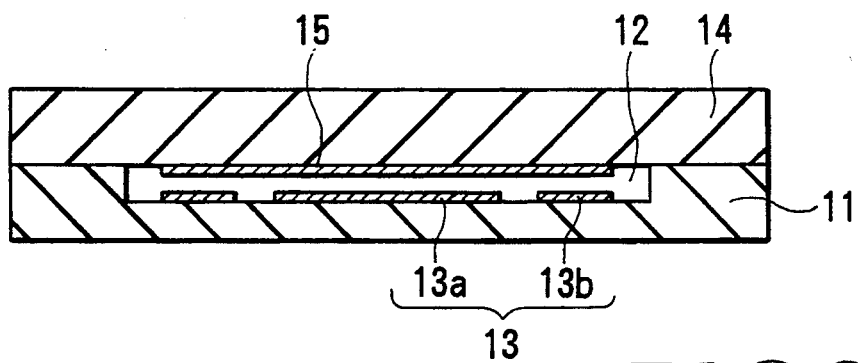

FIGS. 6A and 6B show the arrangement of a capacitive pressure sensor according to still another embodiment of the present invention. The same reference numerals in FIGS. 6A and 6B denote the same parts as in FIGS. 3A and 3B. Referring to FIGS. 6A and 6B, a movable electrode 13 formed on a quartz glass or sapphire substrate 11 has a sensing capacitor portion 13$a$ and a reference capacitor portion 13$b$ formed around the portion 13$a$.

With this arrangement, the same effects as described above can be obtained, and high-precision pressure measurement can be performed.

A method of manufacturing the capacitive pressure sensor described with reference to FIGS. 3A and 3B will be described below.

Figure 7A:
FIGS. 7A to 7G are sectional views for explaining a method of manufacturing a capacitive pressure sensor according to the present invention.

FIGS. 7A to 7G show the steps in manufacturing the capacitive pressure sensor. As shown in FIG. 7A, the quartz glass or sapphire substrate 11 is prepared. At least the surface of a peripheral portion, of the quartz glass or sapphire substrate 11, which is to be bonded to the quartz glass or sapphire substrate 14, is mirror-polished.

Figure 7B:
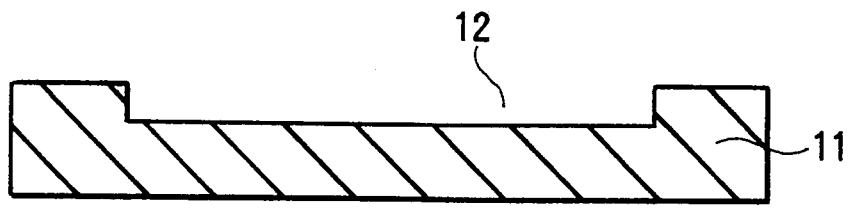

As shown in FIG. 7B, the groove 12 is formed in a central portion of the quartz glass or sapphire substrate 11 by a wet etching method using an HF etching solution or a dry etching method.

Figure 7C:
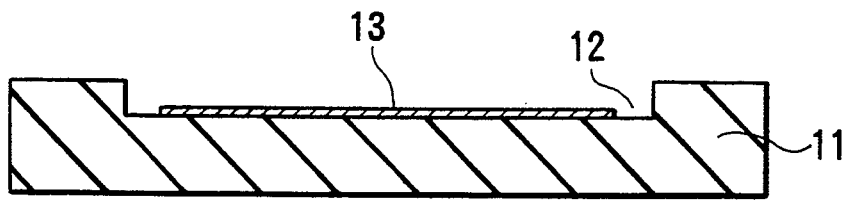

As shown in FIG. 7C, the movable electrode 13 consisting of a conductive thin film is formed in the groove 12 of the quartz glass or sapphire substrate 11 by CVD, sputtering, or vacuum deposition.

Figure 7D:

As shown in FIG. 7D, the quartz glass or sapphire substrate 14 is prepared. At least the surface of a peripheral portion, of the quartz glass or sapphire substrate 14, which is to be bonded to the quartz glass or sapphire substrate 11, is mirror-polished.

Figure 7E:
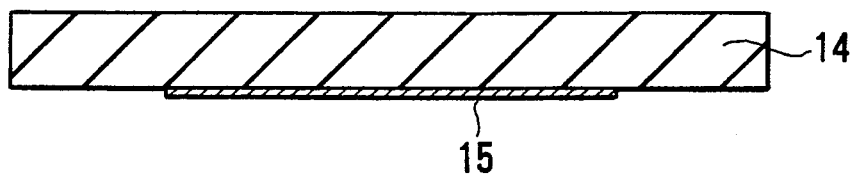

As shown in FIG. 7E, the stationary electrode 15 consisting of a conductive thin film is formed on a central portion of the quartz glass or sapphire substrate 14 by CVD, sputtering, or vacuum deposition.

Figure 7F:
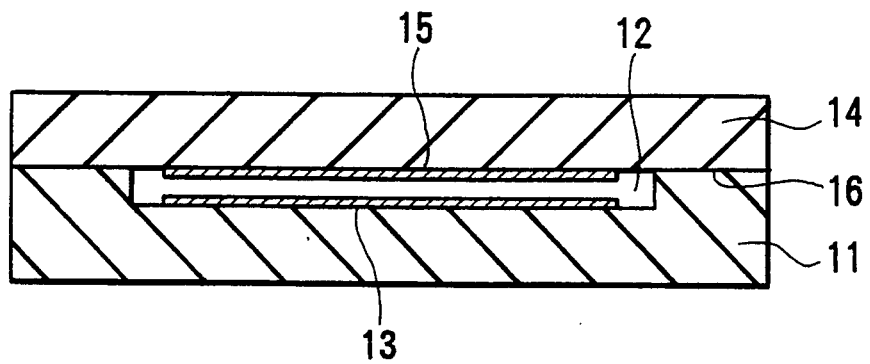

As shown in FIG. 7F, the quartz glass or sapphire substrate 11, on which the movable electrode 13 is formed, and the quartz glass or sapphire substrate 14, on which the stationary electrode 15 is formed, are bonded together at the bonding portions 16 such that their electrode-formed surfaces oppose each other in a clean atmosphere at a temperature near room temperature without using any bonding material. The resultant structure is then heat-treated at a temperature of 200° C. to a temperature less than the melting temperature of each substrate, thereby firmly bonding the two substrates.

Figure 7G:
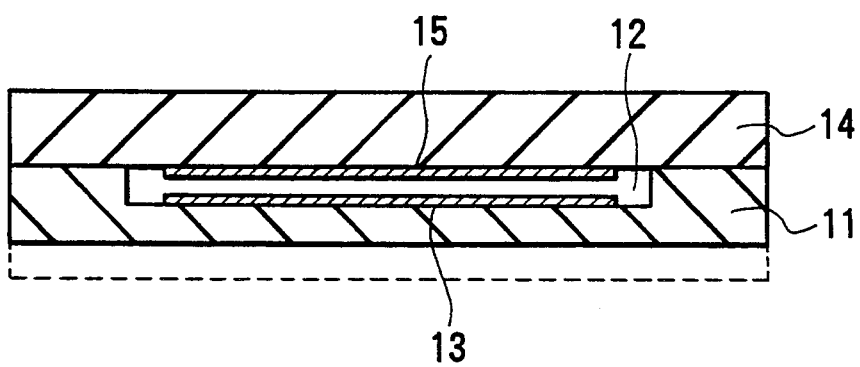

Subsequently, as shown in FIG. 7G, the surface, of the quartz glass or sapphire substrate 11, on which the movable electrode 13 is not formed is polished so that the quartz glass or sapphire substrate 11 has a predetermined thickness corresponding to a pressure range.

A mechanism of directly bonding the substrates 11 and 14 together will be described below.

Only a case of a quartz glass substrate will be described here.

Figure 8A:
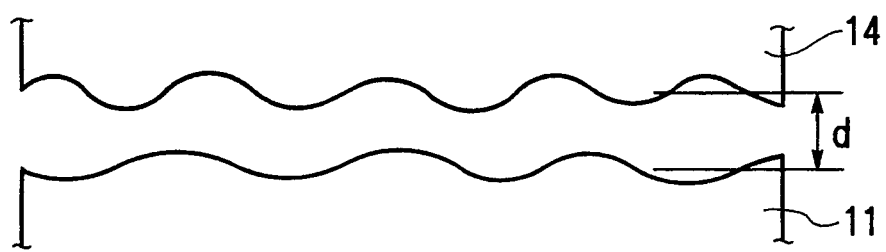
Figure 8B:
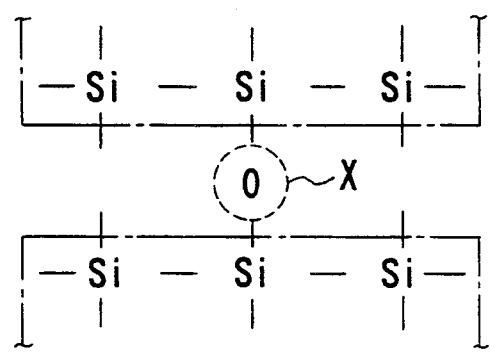

FIGS. 8A and 8B show a change in the bonded state between the quartz glass substrate 11 and the quartz glass substrate 14. As shown in FIG. 8A, while the quartz glass substrate 11 and the quartz glass substrate 14 are bonded together at room temperature, it is considered that they are tightly bonded together at their bonding surfaces mainly by a physical coupling force based on a Van der Waal force.

When this structure undergoes heat treatment, the molecular structure exhibits a chemical bond such as an Si—O—Si bond "X". It is, therefore, considered that the quartz glass substrates 11 and 14 are tightly bonded to each other by a stronger chemical bonding force.

As described above, the quartz glass substrates 11 and 14 are tightly and firmly bonded to each other by a systematic bonding scheme based on physical and chemical bonding forces generated in the bonded state of the substrates 11 and 14 and in the heat treatment process.

Figure 9:
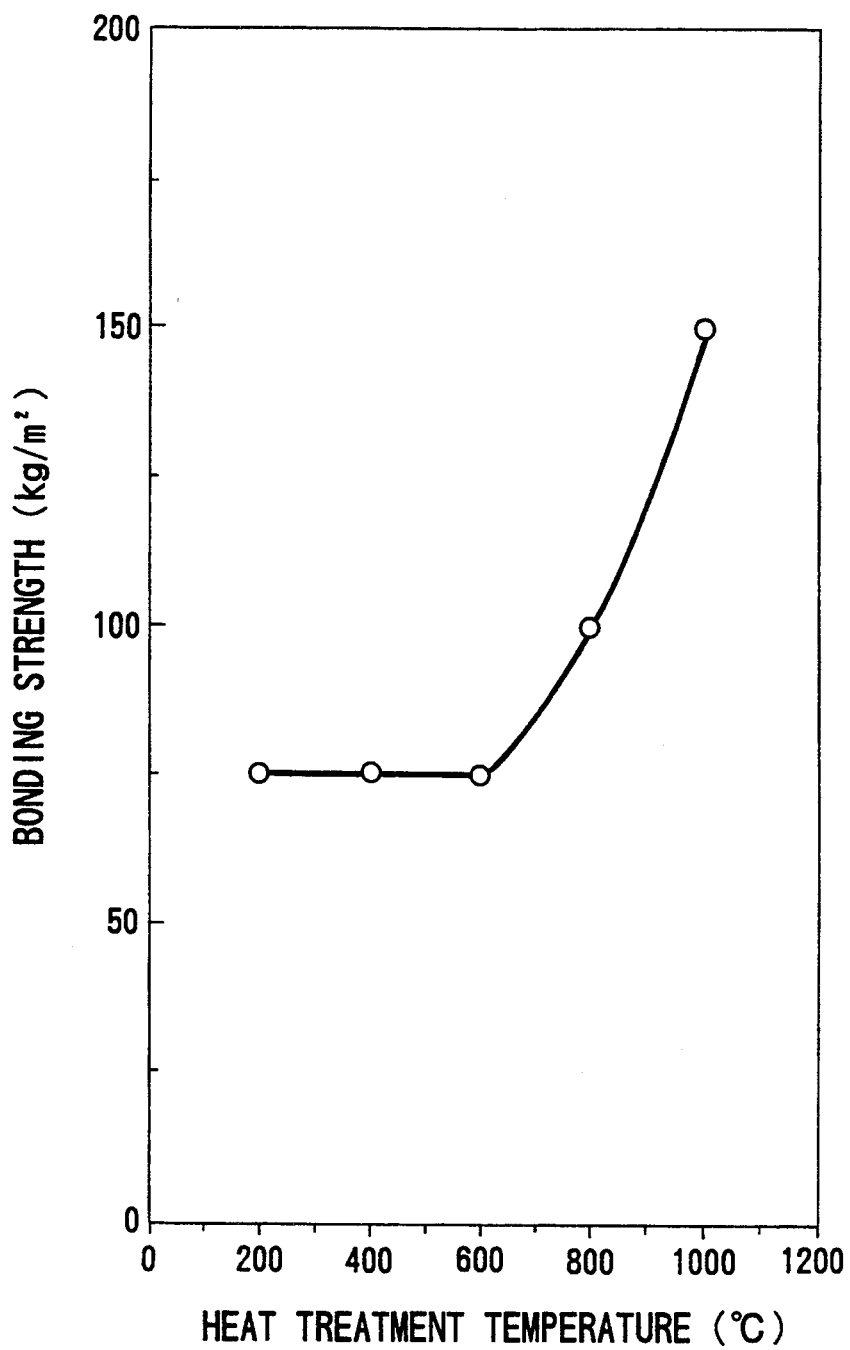
FIG. 9 is a graph for explaining the bonding strength of a bonding portion between quartz glass substrates as a function of a heat-treatment temperature.

FIG. 9 shows the relationship between the heat treatment temperature for bonding the above quartz glass substrates together and the bonding strength, which relationship is obtained by experiments. Referring to FIG. 9, the curve represents the bonding strength of the quartz glass substrates 11 and 14, which strength indicates a mean value at each temperature. As is apparent from FIG. 9, it is found that the bonding strength of the quartz glass substrates 11 and 14 is practically high enough to manufacture a capacitive pressure sensor. In addition, since a high bonding strength of the quartz glass substrates 11 and 14 can be obtained at a relatively low heat treatment temperature, the movable electrode 13 and the stationary electrode 15 can be formed at a relatively low temperature, and an electrode material having relatively low heat resistance can be used.

In the above embodiments, the quartz glass or sapphire substrate 11 and the quartz glass or sapphire substrate 14 have square shapes. However, the present invention is not limited to this. Rectangular, polygonal, circular, or elliptical substrates may be used.

In addition, in the above embodiments, the groove 12, the movable electrode 13, and the stationary electrode 15 have square shapes. The present invention is not limited to this. It is apparent that they may be rectangular, polygonal, circular, or elliptical.

Furthermore, in the above embodiments, a vacuum, air, or another substance may be set in the groove 12 formed between the quartz glass or sapphire substrate 11 and the quartz glass or sapphire substrate 14.

Moreover, in the above embodiments, the quartz glass or sapphire substrate 11 and the quartz glass or sapphire substrate 14 are respectively used as the first and second insulating substrate portions. However, the present invention is not limited to this. Even if a glass substrate or a ceramic substrate, which is a transparent insulating material with respect to visible light, is used, direct bonding can be performed through physical and chemical actions, thereby obtaining the same effects as described above.

As has been described above, according to the present invention, since the first and second insulating substrate portions are directly bonded to each other through physical and chemical actions, a gap can be obtained between the first and second electrodes with good controllability regardless of a change in stress generated in each bonding portion due to manufacturing conditions, measurement conditions, a change with time, and the like. Therefore, a high-precision, high-reliability pressure sensor can be manufactured at low cost.

What is claimed is:

1. A capacitive pressure sensor comprising:

a first substrate consisting essentially of quartz glass;

a second substrate of a rectangular cross section consisting essentially of quartz glass and having:
- a peripheral portion directly bonded to the first substrate, wherein bonding of the first and second substrates is performed at a temperature not higher than a melting point of quartz glass and without forming a bonding layer,
- a groove formed in a central portion of a main surface of the second substrate, wherein the first and second substrates oppose each other through the groove, and
- an external surface opposite to the main surface that is flat;

a first electrode with an entire surface coupled to and in tight contact with a surface of the first substrate which opposes the second substrate, the first electrode being movable together with the first substrate; and a second electrode with an entire surface coupled to and in tight contact with a surface of the second substrate that opposes the first substrate such that the second electrode is parallel to the first electrode.

2. A capacitive pressure sensor comprising:

a first substrate consisting essentially of sapphire;

a second substrate of a rectangular cross section consisting essentially of sapphire and having:
- a peripheral portion directly bonded to the first substrate, wherein bonding of the first and second substrates is performed at a temperature not higher than a melting point of sapphire, and without forming a bonding layer, and without causing a fused layer to appear in a boundary surface between the first and second substrates such that the first substrate is bonded to the second substrate by means of physical and chemical forces,
- a groove formed in a central portion of a main surface of the second substrate, wherein the first and second substrates oppose each other through the groove, and
- an external surface opposite to the main surface that is flat;

a first electrode with an entire surface coupled to and in tight contact with a surface of the first substrate which opposes the second substrate, the first electrode being movable together with the first substrate; and a second electrode with an entire surface coupled to and in tight contact with a surface of the second substrate that opposes the first substrate such that the second electrode is parallel to the first electrode.

* * * * *